United States Patent Office 3,015,496
Patented Jan. 2, 1962

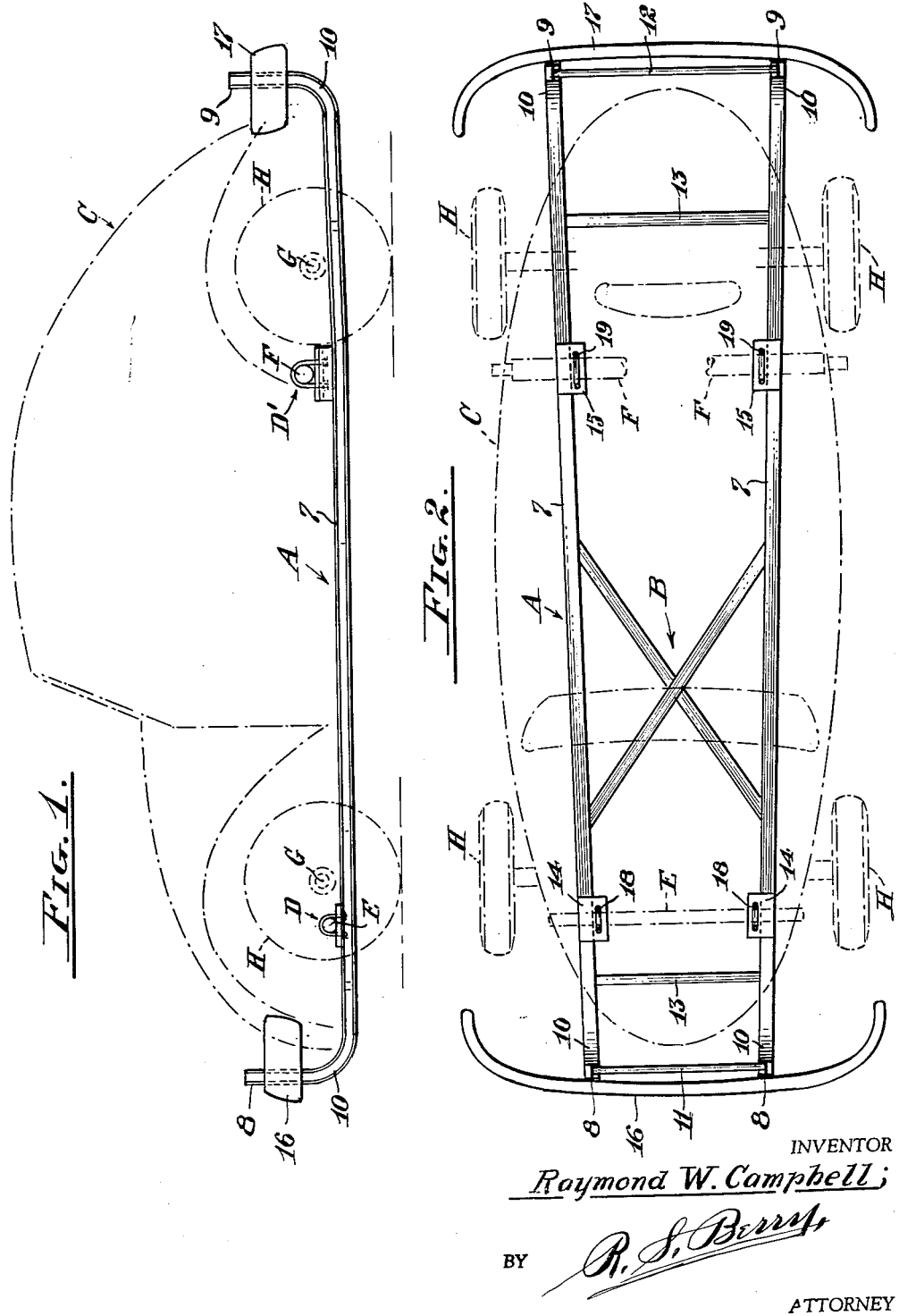

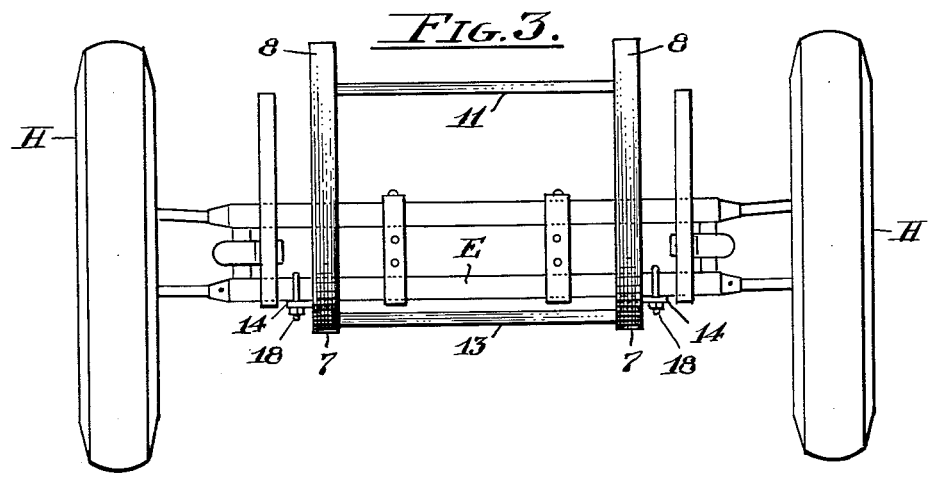
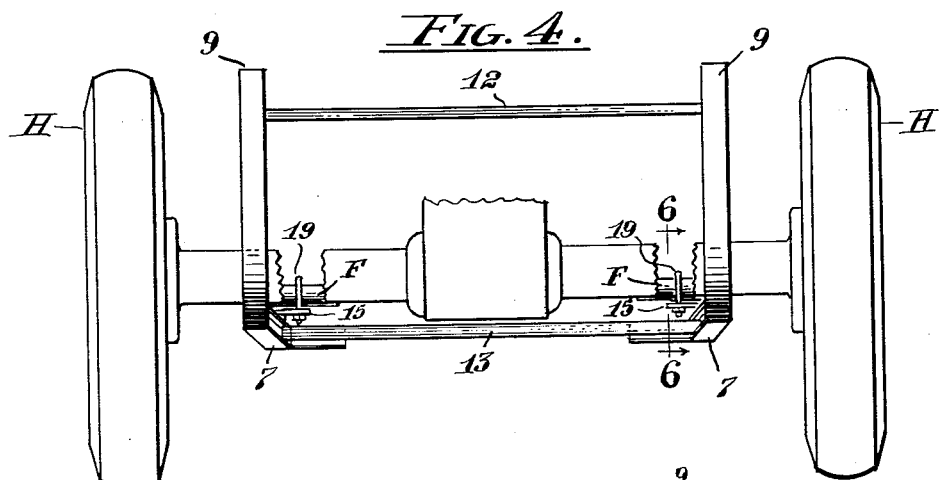
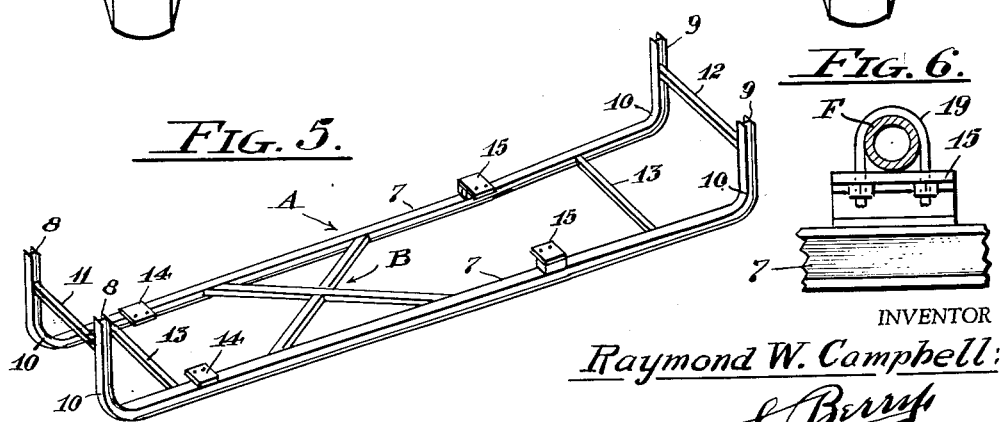

3,015,496
SUB-FRAME FOR MOTOR VEHICLES
Raymond W. Campbell, 4225 Wawona St.,
Los Angeles 65, Calif.
Filed May 16, 1958, Ser. No. 735,792
2 Claims. (Cl. 280—150)

This invention relates to an under-frame or sub-frame for motor vehicles and has as its primary object the provision of an auxiliary frame structure which is adapted to be applied as an attachment to a motor vehicle to reinforce the chassis or body of the latter, and also serve as a guard to protect the vehicle in event of collision and further act to stabilize the vehicle against being accidentally overturned.

Another object is to provide a construction in the frame wherein its ends extend upwardly at the front and rear ends of the vehicle and thereby serve as mountings for bumper bars, and then co-act with the latter to provide a protective guard against impacts being directed against the ends of the vehicle body.

Another object is to provide a construction in the frame whereby it may be suspended and carried in a position underlying or below the axis of rotation of the vehicle wheels.

A further object is to provide an auxiliary sub-frame for attachment to a wheeled motor vehicle of the type which when marketed is devoid of a chassis and has its running gear carried on axles directly attached to a panel constituting the vehicle floor, the sub-frame being so constructed and arranged as to minimize possibility of the vehicle floor being buckled or collapsed in event of collision with other vehicles or other impacts to which the vehicle may be subjected and particularly such as are directed against the front and rear ends of the vehicle.

With the foregoing objects in view together with such other objects and advantages as may subsequently appear, the invention resides in the parts and in the combination, construction and arrangement of parts hereinafter described and claimed, and illustrated by way of example in the accompanying drawing, in which:

FIG. 1 is a view of the sub-frame as seen in side elevation and indicating the manner of its application to a wheeled motor vehicle;

FIG. 2 is a plan view of the structure shown in FIG. 1;

FIG. 3 is a front end view of the frame with the bumper bar removed showing it as applied;

FIG. 4 is a view in elevation of the rear end of the frame with the bumper bar removed showing it as applied;

FIG. 5 is a perspective view of the frame showing it detached and with the bumper bars removed; and FIG. 6 is a detail in section and elevation taken on the line 6—6 of FIG. 4.

Referring to the drawings more specifically A indicates generally a sub-frame which embodies a pair of horizontally extending side rails 7—7, preferably comprising steel I-beams, which rails have elongated upwardly extending front and rear end portions 8—8 and 9—9 respectively and which end portions preferably extend in continuation of the side rails 7—7 and joined thereto in curved interconnection therewith by upwardly curved bends 10. The end portions 8—8 at one end of the side rails 7—7 extend in parallel relation to each other as do the end portions 9—9 at the other end of the side rails.

The side rails 7—7 slightly diverge relative to each other from the front to the rear ends thereof and have their upturned end portions 8—8 and 9—9 joined by cross-bars 11 and 12 respectively and are also joined by a pair of cross-bars 13—13 arranged in inwardly spaced relation to the bends 10 and located in outwardly spaced relation to a pair of laterally opposed brackets 14—14 and 15—15 rigidly affixed to the upper faces of the rails 7—7 and projecting inwardly therefrom. The side rails 7—7 are further connected together by conventional X-bracing B located between the brackets 14—15. Bumper bars 16—17 may be mounted on the upstanding front and rear end portions 8—8 and 9—9 respectively in a conventional manner, such as by welding or by connections commonly employed in attaching bumper bars to supports and per se constituting no part of the present invention, since the bumpers need not necessarily be applied to the frame A and since the frame as an article of manufacture may be marketed as an attachment without the bumpers, as shown in FIG. 5.

The sub-frame A is designed to be fixedly mounted on the under side of a motor vehicle C to extend longitudinally thereof in substantially immovable relation thereto with the upstanding end portions 8—8 and 9—9 extending upwardly at the front and rear ends of the vehicle body in slightly spaced relation thereto, as particularly shown in FIG. 1, the sub-frame being supported on the vehicle C by suspending it therefrom by means of suitable detachable connections D—D' attached to the brackets 14—14 and 15—15 respectively. The connections D—D' preferably comprise U-bolts 18—19 respectively of which the U-bolts 18 are here shown as positioned astride a sheathed torsion bar E, embodied in the front axle assembly of the vehicle, and engaged with the brackets 14—14 which underlie the bar E, as shown in FIG. 3, while the U-bolts 19 are positioned astride sheathed torsion bars F, embodied in the rear axle assembly of the vehicle, and engaged with the brackets 15—15 which underlie the bars F as shown in FIG. 6.

The ends of the U-bolts pass through the brackets and have clamping nuts *a* screwed thereon which when tightened to bear against the underside of the brackets, firmly clamp the frame on the sheathed torsion bars E and F against movement relative thereto and against movement longitudinally and transversely of the vehicle. When the sub-frame A is thus mounted on the torsion bars E and F it will be suspended relative to the underside of the vehicle C with the horizontally extending portions of the rails 7—7 disposed on a plane below the spindles G—G of the front and rear wheels H—H of the vehicle as particularly shown in FIGS. 1, 3 and 4 whereby the load of the frame will be well below the center of gravity of the vehicle so as to have a stabilizing effect tending to prevent accidental overturning of the vehicle.

By the provision of the construction of the frame A and the mode of mounting it on the vehicle as here set forth, the frame will serve as a guard affording protection for the vehicle against damage in event of ordinary front and rear end collision where impact is imposed on either or both the ends of the frame A since such impacts are delivered to the side rails 7—7 longitudinally thereof through their upturned ends 8—8 and 9—9 and which latter by reason of being formed in continuation of the side rails and connected thereto by the curvatures or bends 10 will act to absorb the shock of initial impact to a large extent. The upturned end portions 8—8 and 9—9 by reason of extending vertically over the ends of the vehicle body as indicated in FIG. 1, whether equipped with bumpers 16—17 or not, serve as guards to protect the ends of the vehicle body in event of endwise collision which is particularly advantageous where the frame A is applied to motor vehicles wherein the fuel tank is disposed adjacent one end of the vehicle and the engine is disposed adjacent the other end thereof.

An important feature of the invention resides in the upturned forward end portions 8 having a length such as to protrude above the plane of the undersides of the side rails 7—7 a distance exceeding the height of the side rails above the ground whereby, in event of impact on either end of the frame of sufficient force as to break the connections D—D' and thereby free the frame and cause it to drop to the ground, the upturned ends of the frame presented in the forward direction of travel of the vehicle will be caught by the front end of the vehicle body so that the frame A will then act as a drag to retard advance of the vehicle, and whereby the frame A will be prevented from becoming completely separated from the vehicle and then possibly constitute an obstruction on a highway.

In the manufacture of small, light low cost automobiles, the vehicles have no wheel supported frame underlying the floor thereof particularly as to such vehicles of foreign make, the running gear being attached directly to the underside of the vehicle floor which comprises a panel of sheet metal. This construction is highly objectionable because of its being susceptible to irreparable collapse or buckling in event of collision. The present invention is designed to afford a means for remedying this condition, it being contemplated to produce the frame A for marketing as a unitary structure to be applied to a vehicle of this type as an attachment, but which however may be applied to the ordinary frame vehicles as a supplemental reinforcing frame structure.

A feature of the invention resides in the readiness with which the frame may be applied to and removed from a standard vehicle without alteration or disturbance of the structure thereof since the frame being disposed beneath the front and rear wheel axle assemblies ordinarily obviates any necessity of detaching or removing springs, shock absorbers, and other parts of the vehicle.

It is common practice to produce automobiles having wheeled frames embodying side rails, X-bracing and tie rods and to which frames the bodies of the vehicles are rigidly attached, but such frames are not ordinarily adapted to be suspended beneath the vehicle body to underlie the axis of the vehicle wheels as in the present invention, nor are they operable, in event of being so positioned, to function as a guard to protect the ends of the vehicle as is the frame herein set forth.

While I have shown and described a specific embodiment of the invention, it is not limited to the exact structure shown but embraces any modifications and equivalents thereof as come within the scope of the appended claims.

I claim:

1. In a vehicle having a body carried on wheeled front and rear axle assemblies including sheathed torsion bars; a sub-frame embodying a pair of side rails, means supporting said side rails solely from said sheathed torsion bars in fixed engagement therewith in dependent relation thereto with said rails extending longitudinally of said body independent thereof, means rigidly interconnecting said rails; said side rails having free integral upwardly curved front and rear end portions terminating in vertically extending guard portions disposed in outwardly spaced detached relation to the lower portions of said front and rear ends of said body.

2. In a vehicle having a body carried on wheeled front and rear axle assemblies and having an underside and front and rear ends; a sub-frame embodying a pair of spaced rigidly interconnected side rails arranged beneath the underside of said body and extending continuously throughout the length thereof, means fixedly suspending said sub-frame beneath the under side of said body apart therefrom, said side rails each having front and rear end portions projecting outwardly beyond the front and rear ends of said body, and a guard member fixed on the projecting front and rear end portions of each of said side rails, said guard members extending vertically in overlying horizontally spaced unattached relation to the front and rear ends of said body whereby the lower portions of said body ends are shielded against end impacts; said sub-frame constituting a carrier for said end guard members apart from said body whereby collision forces directed toward either or both ends of said body against said guard members will be directly imposed endwise on said rails apart from said body.

References Cited in the file of this patent

UNITED STATES PATENTS

| | | |
|---|---|---|
| 529,041 | McCarthy | Nov. 13, 1894 |
| 1,376,301 | Tobin | Apr. 26, 1921 |
| 1,407,835 | Bovard et al. | Feb. 28, 1922 |
| 1,446,942 | Son | Feb. 27, 1923 |
| 1,498,690 | Hunziker | June 24, 1924 |
| 1,683,283 | Bowman | Sept. 4, 1928 |
| 1,866,265 | Moss | July 5, 1932 |
| 2,033,493 | Straussler | Mar. 10, 1936 |
| 2,043,542 | Johnson | June 9, 1936 |
| 2,747,887 | Schilberg | May 29, 1956 |
| 2,846,095 | Sonneman | Aug. 5, 1958 |

FOREIGN PATENTS

| | | |
|---|---|---|
| 989,417 | France | May 23, 1951 |